United States Patent
Tanaka (10) Patent No.: US 10,549,610 B2
(45) Date of Patent: Feb. 4, 2020

(54) VEHICLE DOOR

(71) Applicant: TOYOTA JIDOSHA KABUSHIKI KAISHA, Toyota-shi (JP)

(72) Inventor: Shinobu Tanaka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 16 days.

(21) Appl. No.: 15/867,858

(22) Filed: Jan. 11, 2018

(65) Prior Publication Data

US 2018/0208029 A1   Jul. 26, 2018

(30) Foreign Application Priority Data

Jan. 20, 2017   (JP) ................ 2017-008603

(51) Int. Cl.
*B60J 5/04* (2006.01)

(52) U.S. Cl.
CPC ............. *B60J 5/0443* (2013.01); *B60J 5/045* (2013.01); *B60J 5/0429* (2013.01); *B60J 5/0437* (2013.01); *B60J 5/0458* (2013.01); *B60J 5/0461* (2013.01)

(58) Field of Classification Search
CPC ... B60J 5/04; B60J 5/0412; B60J 5/042; B60J 5/0422; B60J 5/0425; B60J 5/0437; B60J 5/0443; B60J 5/0458
USPC ..................................................... 296/146.6
See application file for complete search history.

(56) References Cited

U.S. PATENT DOCUMENTS

| | | | |
|---|---|---|---|
| 5,580,120 A | 12/1996 | Nees et al. | |
| 9,266,412 B2 * | 2/2016 | Fujihara | B60J 5/0443 |
| 9,592,721 B1 * | 3/2017 | Kelly | B60J 5/0422 |
| 2003/0042754 A1 * | 3/2003 | Seo | B60J 5/0437 |
| | | | 296/146.6 |
| 2014/0375078 A1 * | 12/2014 | Fujihara | B60J 5/0443 |
| | | | 296/146.6 |

(Continued)

FOREIGN PATENT DOCUMENTS

| | | |
|---|---|---|
| JP | 4-92718 | 3/1992 |
| JP | 4-238725 | 8/1992 |
| JP | 06072152 A * | 3/1994 |

(Continued)

OTHER PUBLICATIONS

English translation of KR 2005-047897; Retreived Apr. 1, 2019 via KIPRIS located at http://eng.kipris.or.kr/enghome/main.jsp. (Year: 2019).*

*Primary Examiner* — Jason S Daniels
(74) *Attorney, Agent, or Firm* — Oblon, McClelland, Maier & Neustadt, L.L.P.

(57) ABSTRACT

A vehicle door includes an outer panel, an inner panel including an inner wall portion, a side wall portion, and a flange portion, an impact beam provided so to extend between the outer panel and the inner wall portion on a surface parallel to inner wall portion, and a bracket including a fixed portion, a joint portion, and a recessed portion. The recessed portion recesses toward an inner-panel side such that a tip end of the impact beam is distanced from the bracket. In an extending direction of the impact beam, a yield strength of a region from the fixed portion to a tip end position of the impact beam for a load applied from the outer panel-side is lower than a yield strength of a region from the tip end position of the impact beam to the joint portion for the load applied from the outer-panel side.

10 Claims, 4 Drawing Sheets

(56) References Cited

U.S. PATENT DOCUMENTS

2015/0367715 A1   12/2015   Inamoto

FOREIGN PATENT DOCUMENTS

| JP | 7-232555 | | 9/1995 |
| JP | 8-67146 | A | 3/1996 |
| JP | 2001-277852 | A | 10/2001 |
| JP | 2009-190664 | | 8/2009 |
| JP | 2014-162301 | | 9/2014 |
| KR | 2005047897 | A * | 5/2005 |

* cited by examiner

VEHICLE DOOR

INCORPORATION BY REFERENCE

The disclosure of Japanese Patent Application No. 2017-008603 filed on Jan. 20, 2017 including the specification, drawings and abstract is incorporated herein by reference in its entirety.

BACKGROUND OF THE DISCLOSURE

1. Technical Field

This disclosure relates to a vehicle door.

2. Description of Related Art

A vehicle door of Japanese Patent Application Publication No. 2014-162301 (JP 2014-162301 A) includes an outer panel, and an inner panel placed on an inner side in a vehicle width direction relative to the outer panel in an opposed manner. An impact beam extending from a vehicle front side to a vehicle rear side is placed between the outer panel and the inner panel. An end of the impact beam on the vehicle front side is fixed to an outer surface of a generally plate-shaped bracket in the vehicle width direction. An end of the bracket on the vehicle front side is fixed to the inner panel, and the impact beam is hereby fixed to the inner panel via the bracket.

SUMMARY

In the vehicle door of JP 2014-162301 A, when other objects collide with the vehicle door from an outer side in the vehicle width direction, a load along with the collision is partially received by the impact beam. However, depending on a magnitude and a direction of the load applied to the impact beam, the bracket provided between the impact beam and the inner panel might break, so that the end of the impact beam might come off from the inner panel. More specifically, when a tip end of the impact beam makes point contact with the end of the bracket, a load concentrates on a part of the bracket with which part the tip end of the impact beam makes point contact, the bracket might break starting from the part. If such a situation occurs, a magnitude of a load that can be received by the impact beam might be decreased.

An aspect of the disclosure provides a vehicle door including an outer panel which is plate-shaped; an inner panel including an inner wall portion, a side wall portion, and a flange portion, the inner wall portion opposing to the outer panel, the side wall portion being provided to extend toward the outer panel from an edge of the inner wall portion, the flange portion being connected with an edge of the side wall portion on an outer-panel side, the flange portion being fixed to the outer panel; an impact beam provided so to extend between the outer panel and the inner wall portion on a surface parallel to inner wall portion; and a bracket including a fixed portion, a joint portion, and a recessed portion, the fixed portion being fixed to the side wall portion or the flange portion, the joint portion being jointed to the impact beam on the outer-panel side, the recessed portion recessing toward an inner-panel side such that a tip end P of the impact beam is distanced from the bracket, wherein in an extending direction of the impact beam, a yield strength of a region from the fixed portion to a tip end position of the impact beam for a load applied from the outer panel-side is lower than a yield strength of a region from the tip end position of the impact beam to the joint portion for the load applied from the outer-panel side.

In the above aspect, the bracket may have a connecting portion connecting between the fixed portion and the recessed portion.

In the above aspect, the joint portion may be an engageable portion constituted by a groove recessed toward the inner panel side and extending in the extending direction of the impact beam.

In the above aspect, the tip end of the impact beam is distanced from a bottom surface of the recessed portion in the bracket. Accordingly, even if a load is applied to the impact beam from the outer side in the vehicle width direction, the tip end of the impact beam can hardly make point contact with the bottom surface of the recessed portion in the bracket. This makes it possible to restrain such a situation that the load concentrates on a specific part of the bracket and the bracket breaks starting from that part.

In the above aspect, the recessed portion may curve such that a central part in the extending direction of the impact beam approaches the inner panel.

In the above aspect, the bottom surface of the recessed portion does not bend. Accordingly, even if a load received by the impact beam from the outer side in the vehicle width direction is applied to the recessed portion, the recessed portion can hardly have a stress-concentrated part.

In the above aspect, the bracket may include a reinforcing portion provided so as to extend from the tip end position of the impact beam to the joint portion in the extending direction of the impact beam.

In the above aspect, in the extending direction of the impact beam, the reinforcing portion may be provided so as to extend over an entire region where the recessed portion and the joint portion are provided.

In the above aspect, the bracket may be configured such that a reinforcing portion is provided so as to extend from one side relative to the tip end of the impact beam toward the other side across a tip end position of the impact beam. In a range where the reinforcing portion is provided so as to extend, the bracket can hardly have bending deformation to cause the bottom surface of the recessed portion to approach a tip end of the impact beam. Accordingly, at the time when a load is applied to the impact beam from the outer side in the vehicle width direction, such a situation that the bracket deforms to bend and the tip end of the impact beam makes point contact with the bottom surface of the recessed portion of the bracket can hardly occur.

the connecting portion may be a bending region including a plurality of bending tops, each of the bending tops may extend in a direction intersecting with the extending direction of the impact beam, and the bending tops may be provided side by side in the extending direction of the impact beam.

In the above aspect, at the time when a load is applied to the impact beam from the outer side in the vehicle width direction, the bracket easily deforms starting from the bending tops originally provided in the bending region. As such, the bracket is intentionally provided with the bending region that easily deforms so that the bending region is deformed preferentially, thereby making it possible to restrain the recessed portion in the bracket from deforming. As a result, such a situation that the recessed portion of the bracket deforms and the tip end of the impact beam makes point contact therewith can hardly occur.

In the above aspect, the reinforcing portion may be a bead portion projecting toward the outer panel side or the inner panel side and extending along edges of the recessed portion and the joint portion.

In the above aspect, the end of the impact beam is fixed around the recessed portion in the bracket, and at the time when a load is applied to the impact beam from the outer side in the vehicle width direction, a strong load can be applied around the recessed portion in the bracket. In the above aspect, the bead portion is placed along the edge of the recessed portion, and therefore, even if a strong load is applied around the recessed portion in the bracket from the impact beam, it is possible to appropriately restrain the recessed portion of the bracket from deforming.

In the above aspect, the reinforcing portion may be a burring portion formed such that a peripheral edge of the bracket is raised toward the outer-panel side or the inner-panel side.

In the above aspect, the peripheral edge of the bracket is formed as the burring portion, thereby making it possible to restrain the bracket from deforming in the peripheral edge of the bracket. As a result, such a situation that bending deformation caused in the peripheral edge of the bracket is transmitted to the recessed portion in the bracket starting from the bending deformation can hardly occur.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
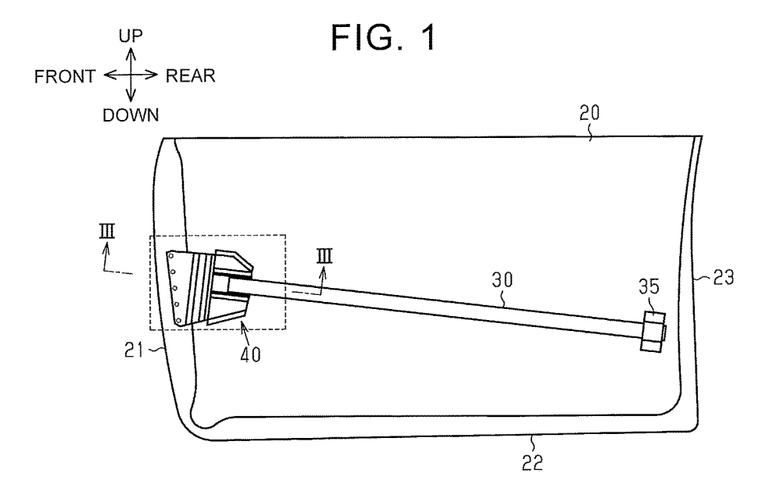
FIG. 1 is a side view of an inner panel and an impact beam.
Figure 2:
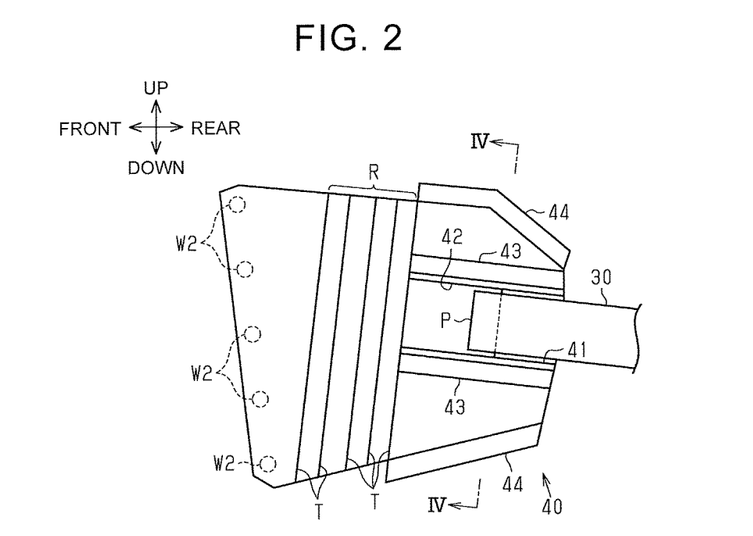
FIG. 2 is an enlarged view of a part surrounded by a broken line in FIG. 1.
Figure 3:
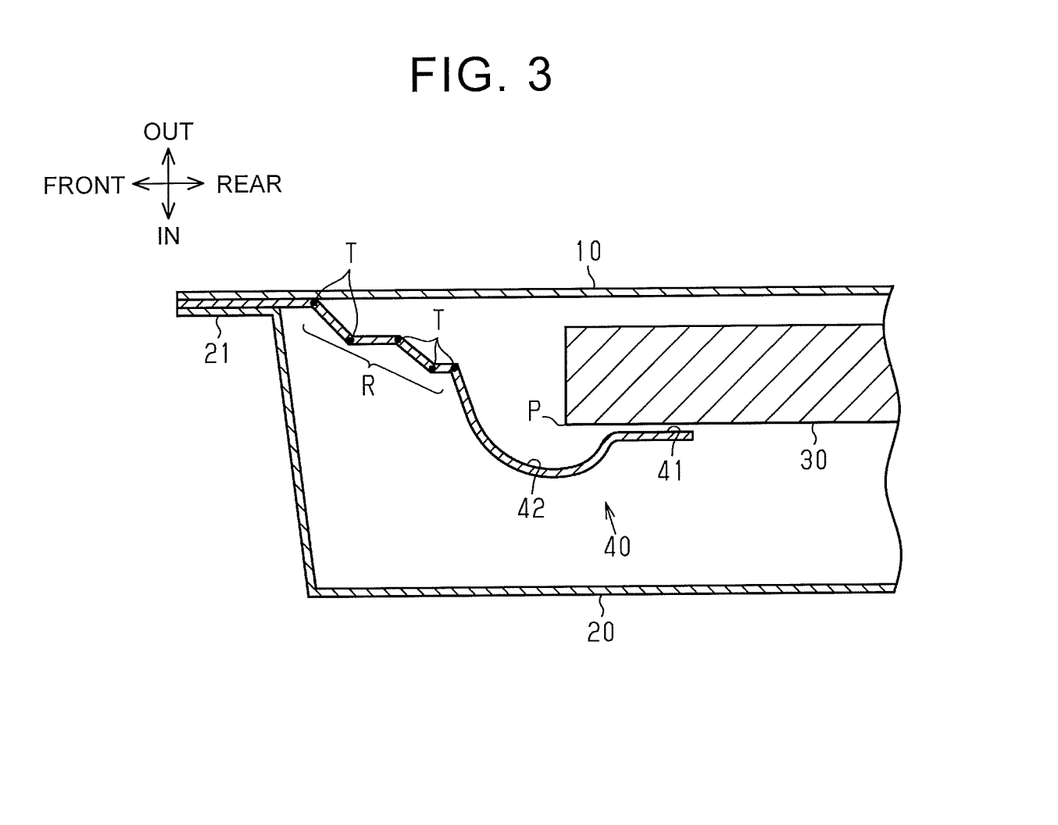
FIG. 3 is a sectional view taken along a line III-III in FIG. 1.

The following describes an embodiment in which the disclosure is applied to a front door on a vehicle left side, with reference to FIGS. 1 to 4. As illustrated in FIG. 3, the front door as a vehicle door includes an outer panel 10, which is a panel provided on an outer side in a vehicle width direction out of two panels constituting the front door, and an inner panel 20 placed on an inner side in the vehicle width direction relative to the outer panel 10 in an opposed manner. The outer panel 10 has a generally square plate shape.

As illustrated in FIG. 1, the inner panel 20 has a generally square shape along a shape of the outer panel 10, in a side view in the vehicle width direction. The inner panel 20 has a curved shape so that its central part is placed on an inner side in the vehicle width direction. That is, the inner panel 20 includes an inner wall portion opposed to the outer panel, a side wall portion provided so as to extend toward an outer side (an outer panel side) in the vehicle width direction from an edge of the inner wall portion, and a flange portion disposed on a surface parallel to the inner wall portion from an edge of the side wall portion on the outer side (the outer panel side) in the vehicle width direction toward an opposite side to a side where the inner wall portion is disposed, the flange portion being joined to the outer panel. More specifically, a front edge portion of the inner panel 20 is formed as a front flange portion 21 that makes surface contact with an inner surface of the outer panel 10 in the vehicle width direction. The front flange portion 21 is provided over an entire region of the front edge portion of the inner panel 20 in the up-down direction. A lower edge portion of the inner panel 20 is formed as a lower flange portion 22 that makes surface contact with the inner surface of the outer panel 10 in the vehicle width direction. The lower flange portion 22 is provided over an entire region of the lower edge portion of the inner panel 20 in a vehicle front-rear direction. A rear edge portion of the inner panel 20 is formed as a rear flange portion 23 that makes surface contact with the inner surface of the outer panel 10 in the vehicle width direction. The rear flange portion 23 is provided over an entire region of the rear edge portion of the inner panel 20 in the up-down direction. The front flange portion 21, the lower flange portion 22, and the rear flange portion 23 in the inner panel 20 are fixed to the outer panel 10 by spot welding. Note that FIG. 1 does not illustrate the outer panel. Further, the inner panel 20 has openings in which a door handle, a loudspeaker unit, and the like are provided, but FIG. 1 does not illustrate the openings.

As illustrated in FIG. 3, an impact beam 30 is placed between the outer panel 10 and the inner panel 20. As illustrated in FIG. 1, the impact beam 30 is provided so as to extend from a vehicle front side to a vehicle rear side. In the present embodiment, the impact beam 30 is slightly inclined to be placed on a lower side toward the vehicle rear side. The impact beam 30 is formed in a bar shape having a circular section.

An end of the impact beam 30 on the vehicle rear side is sandwiched between a plate-shaped mounting bracket 35 and the inner panel 20, so as to be fixed to the inner panel 20. The mounting bracket 35 is fixed to the inner panel 20 by spot welding on a front side relative to the rear flange portion 23 in the inner panel 20.

Figure 4:
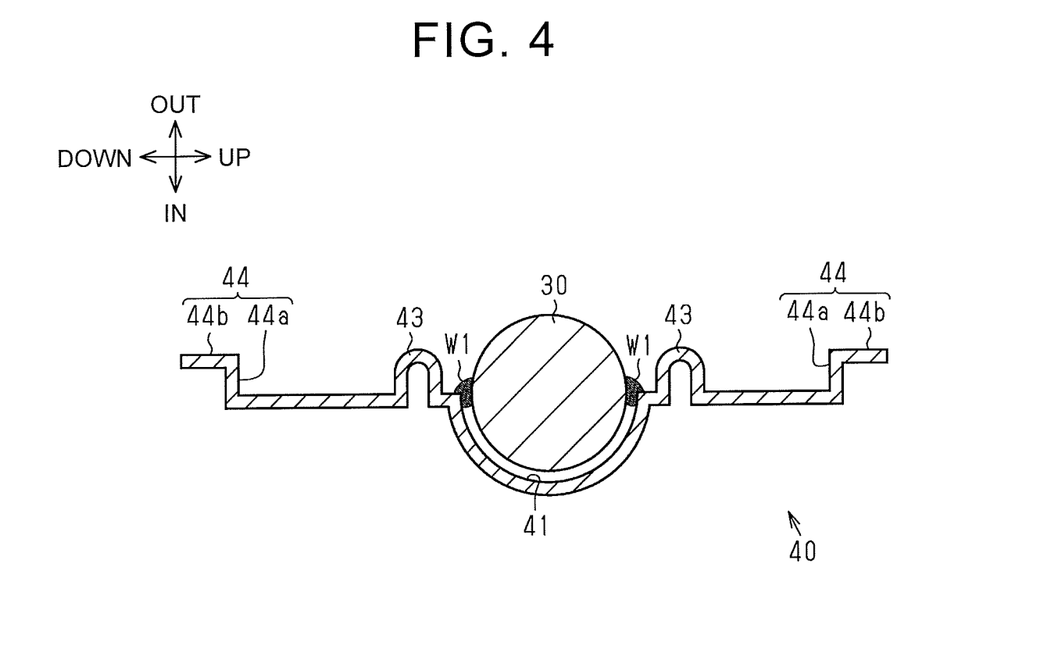
FIG. 4 is an end elevational view taken along a line IV-IV in FIG. 2.

As illustrated in FIG. 2, a bracket 40 for fixing an end of the impact beam 30 on the vehicle front side to the inner panel 20 is attached to the end of the impact beam 30. As illustrated in FIGS. 3 and 4, the bracket 40 is formed such that a plate material having a predetermined shape is shaped by press working and the like. Further, as illustrated in FIG. 2, the bracket 40 has a generally square shape when planarly viewed in the vehicle width direction.

A part of the bracket 40 on the vehicle rear side is provided with a groove-shaped engageable portion 41 with which the end of the impact beam 30 on the vehicle front side is engaged. As illustrated in FIGS. 2 and 3, the engageable portion 41 is provided so as to extend from the front side of the vehicle to the rear side and reaches an edge of the bracket 40 on the vehicle rear side. As illustrated in FIG. 4, the engageable portion 41 is formed in a semicircular shape recessed toward the inner side in the vehicle width direction in a sectional view perpendicular to an extending direction of the impact beam 30. An inside diameter of the semicircle of the engageable portion 41 is slightly larger than a diameter of the impact beam 30.

As illustrated in FIGS. 2 and 3, a recessed portion 42 further recessed toward the inner side in the vehicle width direction relative to a bottom surface of the engageable portion 41 is provided on the front side relative to the engageable portion 41 in the bracket 40. The recessed portion 42 is formed in a semielliptical shape recessed toward the inner side in the vehicle width direction in a sectional view perpendicular to the extending direction of the impact beam 30. A width (a short diameter of the ellipse) of the recessed portion 42 is the same as the inside diameter of the engageable portion 41. As illustrated in FIG. 3, a depth of the recess (a long diameter of the ellipse) of the recessed portion 42 is gradually deepened toward the vehicle front side from an end of the engageable portion 41, and is deepest in a central part of the recessed portion 42 in the vehicle front-rear direction. The depth is gradually shallower toward the vehicle front side from the central part of the recessed portion 42 in the vehicle front-rear direction. Note that, in the present embodiment, an end of the recessed portion 42 on the vehicle front side does not reach a center of the whole bracket 40 in the vehicle front-rear direction.

As illustrated in FIG. 4, an end of the impact beam 30 on the vehicle front side is fixed to the outer side, in the vehicle width direction, of the engageable portion 41 of the bracket 40. The end of the impact beam 30 on the vehicle front side is engaged with an inner side of the recess of the engageable portion 41, and the impact beam 30 is fixed to the bracket 40 by arc-welding. In the present embodiment, the impact beam 30 is fixed to the engageable portion 41 in a state where the engageable portion 41 and the impact beam 30 are aligned with each other, so that a small gap is formed between the bottom surface of the engageable portion 41 and an outer peripheral surface of the impact beam 30. Note that, in the present embodiment, a welding bead W1 between the outer peripheral surface of the impact beam 30 and the engageable portion 41 is indicated by a dot.

As illustrated in FIG. 3, a tip end P of the impact beam 30 on the vehicle front side is placed in a range where the recessed portion 42 of the bracket 40 is provided. Note that, as has been already described, the recessed portion 42 has a shape further recessed toward the inner side in the vehicle width direction relative to the bottom surface of the engageable portion 41. Accordingly, the tip end P of the impact beam 30 on the vehicle front side is distanced from the bottom surface of the recessed portion 42.

As illustrated in FIG. 2, bead portions 43 are provided on an upper side and a lower side of the recessed portion 42 of the bracket 40 as reinforcing portions for raising bending rigidity of the bracket 40. As illustrated in FIG. 4, the bead portion 43 projects toward the outer side in the vehicle width direction. Further, a projecting end side (the outer side in the vehicle width direction) of the bead portion 43 is formed in an arc shape in a sectional view perpendicular to the extending direction of the impact beam 30.

As illustrated in FIG. 2, the bead portions 43 are provided so as to extend in the extending direction of the impact beam 30 along an upper edge and a lower edge of the recessed portion 42, respectively. In the present embodiment, the bead portions 43 are provided over an entire region where the recessed portion 42 and the engageable portion 41 are provided, in the extending direction of the impact beam 30. Further, the bead portions 43 are placed with some distances from the upper edge and the lower edge of the recessed portion 42, respectively. Note that, as described above, the tip end P of the impact beam 30 is placed in the range where the recessed portion 42 is provided. Accordingly, in the extending direction of the impact beam 30, the bead portions 43 are provided so as to extend from a tip end position of the impact beam 30 to the engageable portion 41. The tip end position is a position on a line extending in a direction perpendicular to the extending direction of the impact beam 30 through the tip end P. Further, in this embodiment, in the extending direction of the impact beam 30, the bead portions 43 are provided so as to extend from one side of the tip end P to the other side thereof (for example, from right to left in FIG. 2) across a position of the tip end P of the impact beam 30. That is, the bead portions 43 intersect the line extending in the direction perpendicular to the extending direction of the impact beam 30 through the tip end P.

As illustrated in FIG. 2, burring portions 44 are provided on an upper edge and a lower edge of the bracket 40 as reinforcing portions to raise the bending rigidity of the bracket 40. As illustrated in FIG. 4, the burring portions 44 are configured such that the upper edge and the lower edge of the bracket 40 are raised toward the outer side in the vehicle width direction. In the present embodiment, the burring portion 44 has a generally L-shape in a sectional view, and is constituted by a standing portion 44a standing toward the outer side in the vehicle width direction at a right angle relative to a surface direction of the bracket 40, and a tip end 44b provided so as to extend outward (toward a side opposite to the impact beam 30) in the vehicle up-down direction from a tip end of the standing portion 44a on the outer side in the vehicle width direction.

As illustrated in FIG. 2, the burring portions 44 are provided on respective rear sides, in the vehicle front-rear direction, of the upper edge and the lower edge of the bracket 40, and are provided so as to extend in the vehicle front-rear direction as a whole. In the present embodiment, the burring portions 44 are provided over the entire region where the recessed portion 42 and the engageable portion 41 are provided, in the extending direction of the impact beam 30. Note that, as described above, the tip end P of the impact beam 30 is placed in the range where the recessed portion 42 is provided. Accordingly, in the extending direction of the impact beam 30, the burring portions 44 are provided so as to extend from the tip end position of the impact beam 30 to the engageable portion 41. Further, in this embodiment, in the extending direction of the impact beam 30, the burring portions 44 are provided so as to extend from the one side of the tip end P to the other side thereof (for example, from right to left in FIG. 2) across the position of the tip end P of the impact beam 30. That is, the burring portions 44 intersect the line extending in the direction perpendicular to the extending direction of the impact beam 30 through the tip end P.

As illustrated in FIG. 2, a bending region R is provided on the vehicle front side relative to the bead portions 43 and the burring portions 44 in the bracket 40. In the bending region R, the bracket 40 is bent so that bending tops T are provided so as to extend in the direction perpendicular to the extending direction of the impact beam 30. The bracket 40 is bent several times in the bending region R. More specifically, as illustrated in FIG. 3, the bracket 40 is bent five times in total in an alternate order of a mountain fold, a valley fold, a mountain fold, a valley fold, and a mountain fold from the vehicle rear side when viewed from the outer side in the vehicle width direction. The bending tops T in the bracket 40 are provided so as to extend from the upper edge of the bracket 40 to the lower ledge thereof. Further, the bending tops T in the bracket 40 are provided adjacently to each other in the extending direction of the impact beam 30 and are provided so as to extend in parallel to each other.

As illustrated in FIG. 3, an end of the bracket 40 on the front side relative to the bending region R is formed as a fixed portion, and is sandwiched between the outer panel 10 and the front flange portion 21 of the inner panel 20. The fixed portion of the bracket 40, the outer panel 10, and the front flange portion 21 of the inner panel 20 are fixed by spot welding in a state where they are laminated. Note that, in FIG. 2, welding parts W2 of the bracket 40 to be spot-welded to the front flange portion 21 of the inner panel 20 are indicated by a dotted line.

Next will be described an operation/working-effect of the front door configured as described above. In the front door of the embodiment, when a load is applied to the outer panel 10 from the outer side in the vehicle width direction, the outer panel 10 bends toward the inner side in the vehicle width direction and collides with the impact beam 30, so that the load directed toward the inner side in the vehicle width direction from the outer side in the vehicle width direction is also applied to the impact beam 30. Here, if the tip end P of the impact beam 30 makes point contact with an outer surface of the bracket 40 in the vehicle width direction, a load applied to the impact beam 30 from the outer side in the vehicle width direction is applied, in a concentrated manner, to a part of the bracket 40 with which part the impact beam 30 makes point contact. As a result, the bracket 40 might break starting from the part of the bracket 40 with which part the impact beam 30 makes point contact. If the bracket 40 breaks, the end of the impact beam 30 on the vehicle front side comes off from the inner panel 20, thereby resulting in that a load receivable by the impact beam 30 might become small.

In this regard, in the above embodiment, the tip end P of the impact beam 30 on the vehicle front side is placed in the range where the recessed portion 42 of the bracket 40 is provided and is distanced from the bottom surface of the recessed portion 42. Accordingly, even if a load is applied to the impact beam 30 from the outer side in the vehicle width direction, the tip end P can hardly make point contact with the bottom surface of the bracket 40. This accordingly makes it possible to restrain the bracket 40 from breaking.

In the meantime, as described above, when a load is applied to the impact beam 30 from the outer side in the vehicle width direction, the bracket 40 deforms, thereby resulting in that the tip end P of the impact beam 30 might make point contact with the bottom surface of the bracket 40.

Figure 5:
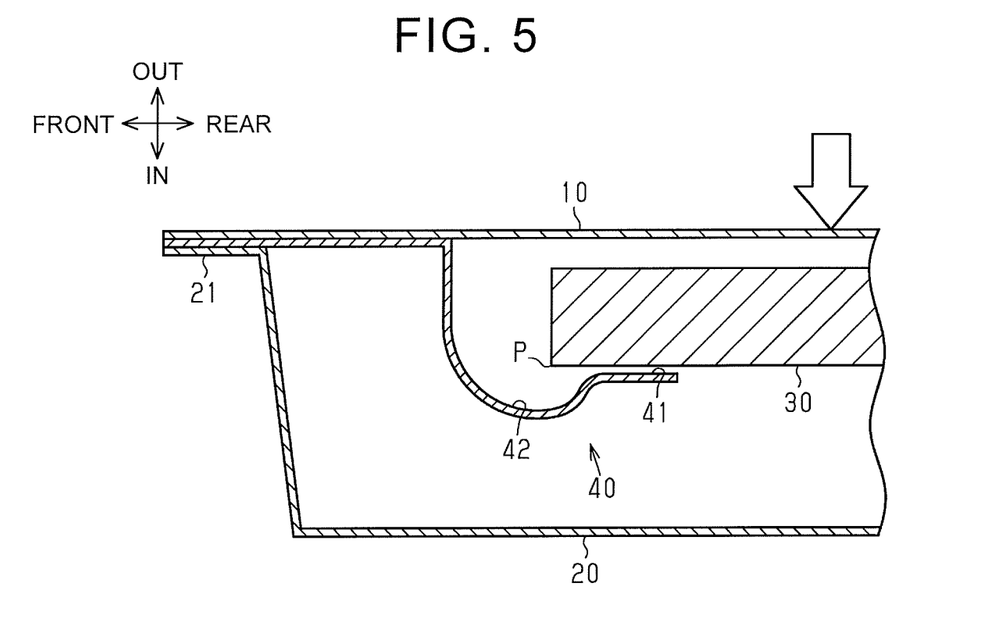
FIG. 5 is a sectional view of a front door in a case where a bracket is not provided with a bending region and a reinforcing portion.
Figure 6:
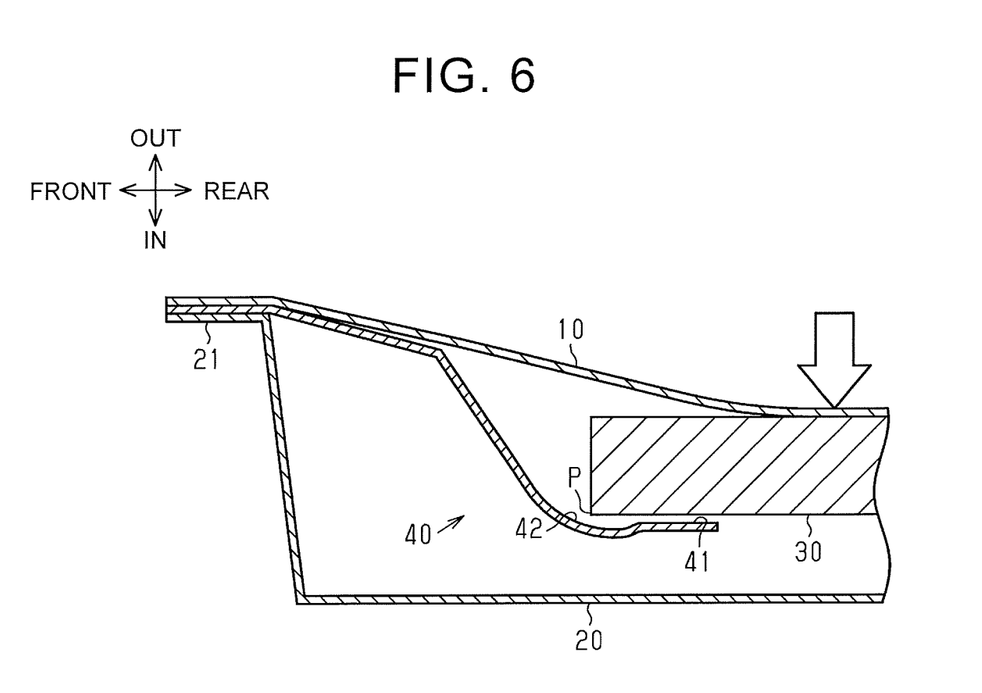
FIG. 6 is a sectional view illustrating a modification at the time when a load is applied to the front door from an outer side in a vehicle width direction in the case where the bracket is not provided with the bending region and the reinforcing portion.

Here, the following describes an example assuming that the bracket 40 is not provided with the bead portions 43, the burring portions 44, and the bending region R. As illustrated in FIGS. 5 and 6, when a load is applied to the outer panel 10 of the front door from the outer side in the vehicle width direction, the outer panel 10 bends toward the inner side in the vehicle width direction and collides with the impact beam 30, and the impact beam 30 is to move toward the inner side in the vehicle width direction. Since the end of the impact beam 30 on the vehicle front side is fixed to the engageable portion 41 of the bracket 40, the load toward the inner side in the vehicle width direction is also applied to the engageable portion 41 of the bracket 40. In the meantime, the end of the bracket 40 on the vehicle front side is fixed to the inner panel 20. Accordingly, when the load toward the inner side in the vehicle width direction is applied to the engageable portion 41 of the bracket 40, the engageable portion 41 and the recessed portion 42 deform to bend, for example, as illustrated in FIG. 6, so that the engageable portion 41 and the recessed portion 42 are deformed into a stretched shape. As a result, the depth of the recessed portion 42 relative to the bottom surface of the engageable portion 41 becomes shallow, thereby resulting in that the tip end P of the impact beam 30 might make point contact with the bottom surface of the recessed portion 42 thus deformed in some cases. If the tip end P of the impact beam 30 makes point contact with the bottom surface of the recessed portion 42 of the bracket 40, the bracket 40 might break starting from that part.

In the above embodiment, in the bracket 40, the bead portions 43 and the burring portions 44 are provided in the region where the recessed portion 42 and the engageable portion 41 are provided, in the extending direction of the impact beam 30. In the range where the bead portions 43 and the burring portions 44 are provided so as to extend, such bending deformation that the engageable portion 41 and the recessed portion 42 of the bracket 40 are stretched to cause the bottom surface of the recessed portion 42 to approach the tip end P of the impact beam 30 hardly occurs. Accordingly, even if a load toward the inner side in the vehicle width direction is applied to the bracket 40 and the bracket 40 deforms, the shapes of the engageable portion 41 and the recessed portion 42 are easily maintained, thereby hardly causing such a situation that the tip end P of the impact beam 30 makes point contact with the bottom surface of the recessed portion 42 of the bracket 40.

Further, as described above, when the impact beam 30 is to move toward the inner side in the vehicle width direction, a load is applied to the engageable portion 41 of the bracket 40. Accordingly, a strong load can be applied to edges of the engageable portion 41 and the recessed portion 42 recessed continuously from the engageable portion 41 in the bracket 40 in comparison with other parts. In the above embodiment, the bead portions 43 are placed along the edges of the engageable portion 41 and the recessed portion 42. On that account, even if a strong load is applied from the impact beam 30 to the edges of the engageable portion 41 and the recessed portion 42 or its vicinal areas in the bracket 40, the load can be received by the bead portions 43 appropriately. As a result, it is possible to more appropriately restrain the engageable portion 41 and the recessed portion 42 of the bracket 40 from deforming.

In a case where a load is applied to the outer panel 10 of the front door from the outer side in the vehicle width direction and the outer panel 10 bends toward the inner side in the vehicle width direction, the outer panel 10 thus bending might collide with the upper edge or the lower edge of the bracket 40, which might cause bending deformation in the upper edge or the lower edge of the bracket 40. Further, other members placed between the outer panel 10 and the inner panel 20, except the impact beam 30, might collide with the upper edge or the lower edge of the bracket 40, which might cause bending deformation in the upper edge or the lower edge of the bracket 40. When the upper edge or the lower edge of the bracket 40 deforms to bend, the deformation might be transmitted to the recessed portion 42 in the bracket 40 starting from a deformed part. In the above embodiment, the upper edge and the lower edge of the bracket 40 are partially formed as the burring portions 44. The burring portions 44 can hardly deform to bend. Even if the burring portions 44 deform to bend, the deformation can be hardly transmitted to the recessed portion 42.

In the meantime, in the above embodiment, the bending region R is provided on the vehicle front side relative to the recessed portion 42 in the bracket 40. In the bending region R, the bending tops T are provided so as to extend in the direction perpendicular to the extending direction of the impact beam 30. Accordingly, when a load toward the inner side in the vehicle width direction is applied to the engageable portion 41 of the bracket 40, the bracket 40 easily deforms such that the bending portions are stretched starting from the bending tops T in the bending region R. That is, in the above embodiment, a region of the bracket 40 on the vehicle rear side (a side where the impact beam 30 is fixed) is formed as a region that can hardly deform, whereas a region of the bracket 40 on the vehicle front side (a side fixed to the inner panel 20) is formed as a region that easily deforms. As such, the bracket 40 is intentionally provided with the bending region R that easily deforms so that the bending region is deformed preferentially, thereby making it possible to restrain the recessed portion 42 in the bracket from deforming. As a result, such a situation that the recessed portion 42 of the bracket 40 deforms and the tip end P of the impact beam 30 makes point contact therewith can hardly occur.

The above embodiment can be modified as follows. How to fix the impact beam 30 to the bracket 40 (the engageable portion 41) is not limited to arc-welding. For example, the impact beam 30 may be fixed to the bracket 40 such that the end of the impact beam 30 on the vehicle front side is sandwiched between the bracket 40 and a plate-shaped mounting bracket. In this case, the bracket 40 and the mounting bracket may be fixed by fastening with bolts and the like or may be welded and fixed by spot welding.

In the bracket 40, the engageable portion 41 can be omitted. Note that, in a case where the engageable portion 41 is omitted, it is necessary to position a rear part of the bracket 40 on the inner side in the vehicle width direction by bending or the like of the bracket 40, so that the impact beam 30 does not interfere with an inner surface of the outer panel 10 in the vehicle width direction.

Figure 7:
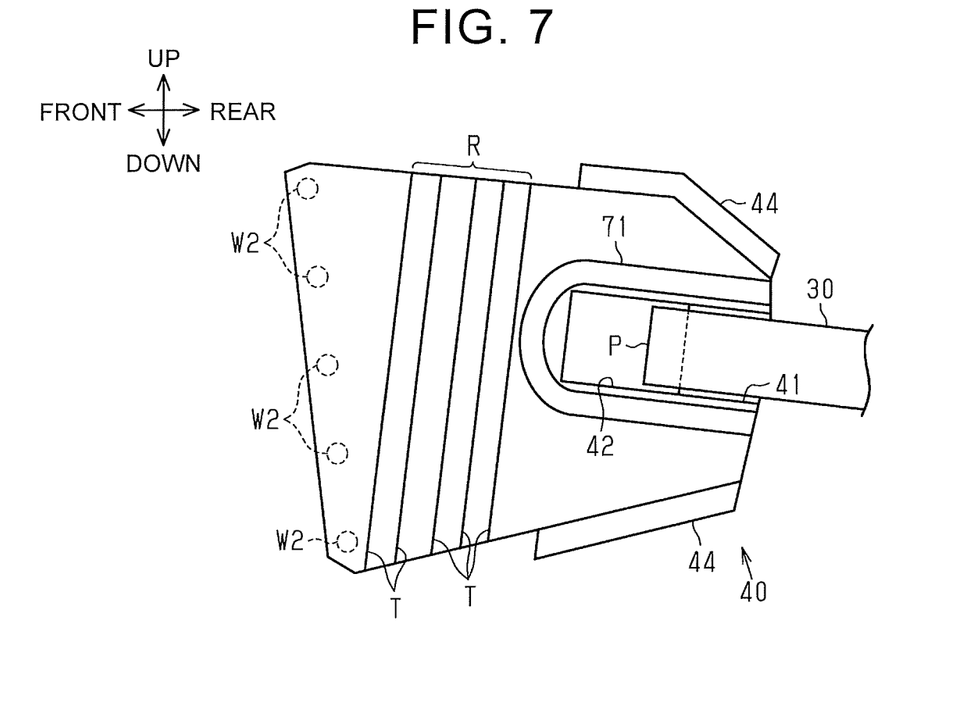
FIG. 7 is a side view of a bracket in a modification.

The bead portions 43 of the bracket 40 may not be provided both on the upper side and the lower side of the recessed portion 42 and the engageable portion 41, but may be provided only on either side thereof. Further, the bead portions 43 may be provided in a part other than the upper side and the lower side of the recessed portion 42 and the engageable portion 41, provided that the bead portions 43 are provided on the vehicle rear side relative to the bending region R in the bracket 40. More specifically, in the example illustrated in FIG. 7, a bead portion 71 of the bracket 40 is provided so as to extend along edges of the recessed portion 42 and the engageable portion 41 on the upper side and the lower side of the recessed portion 42 and the engageable portion 41. The bead portion 71 is provided so as to extend arcuately on the vehicle front side of the recessed portion 42 so as to connect parts of the bead portion 71 on the upper side and the lower side of the recessed portion 42 and the engageable portion 41 to each other. That is, in the example illustrated in FIG. 7, the bead portion 71 is provided so as to extend to surround three sides, i.e., the upper side, the front side, and the lower side of the recessed portion 42 and the engageable portion 41.

The bead portions 43 of the bracket 40 may not necessarily be provided over the entire region where the recessed portion 42 and the engageable portion 41 are provided, in the extending direction of the impact beam 30. Further, the bead portion 43 may not be provided so as to extend along the extending direction of the impact beam 30, but may be provided so as to extend in a direction inclined relative to the extending direction of the impact beam 30. When the bead portions 43 are provided so as to extend at least from one side of the tip end P to the other side thereof across the position of the tip end P of the impact beam 30 in the extending direction of the impact beam 30, it is possible to restrain such a situation that the recessed portion 42 of the bracket 40 deforms and the tip end P of the impact beam 30 makes point contact with the bottom surface of the recessed portion 42.

Figure 8:
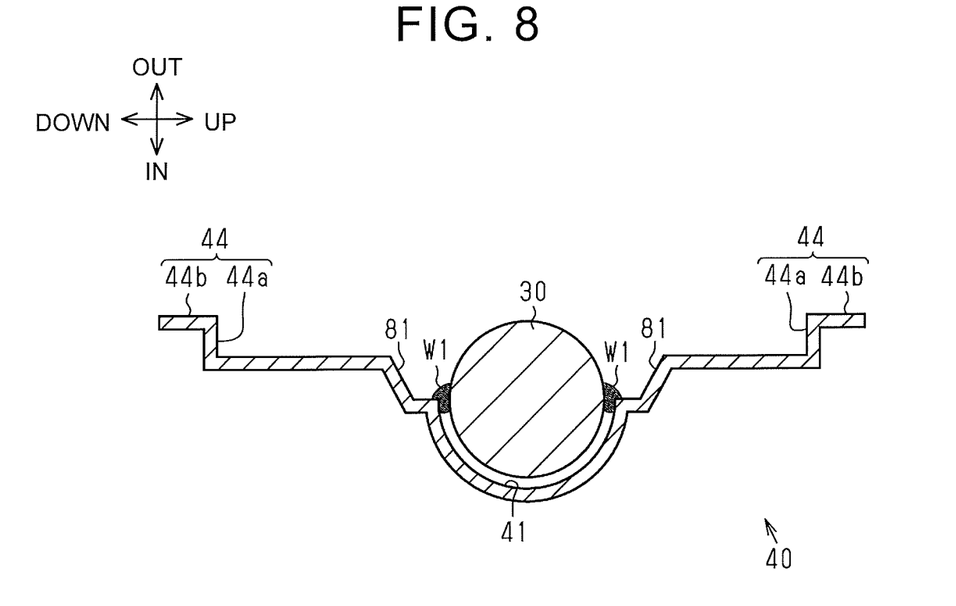
FIG. 8 is an end elevational view of the bracket in the modification.

The shape of the bead portion 43 in the bracket 40 is not limited to the example of the embodiment. For example, the bead portion 43 may have a square section. Further, the bead portion 43 is not limited to the configuration in which the bead portion 43 projects toward the outer side in the vehicle width direction. More specifically, in the example illustrated in FIG. 8, a bead portion 81 of the bracket 40 projects toward the inner side in the vehicle width direction. The bead portion 81 is provided so as to extend along upper edges and lower edges of the engageable portion 41 and the recessed portion 42. Further, the bead portion 81 is continuous with the engageable portion 41 and the recessed portion 42 without any distance with respect to the upper edges or the lower edges of the engageable portion 41 and the recessed portion 42. As a result, the bracket 40 is formed into a shape recessed at two stages toward a central part in the up-down direction in a sectional view perpendicular to the extending direction of the impact beam 30. The bead portion 81 illustrated in FIG. 8 can also yield generally the same effect as the effect of the bead portion 43 in the above embodiment.

The burring portion 44 of the bracket 40 may be provided on only either one of the upper edge and the lower edge of the bracket 40. The burring portion 44 of the bracket 40 may not necessarily be provided over the entire region where the recessed portion 42 and the engageable portion 41 are provided, in the extending direction of the impact beam 30. At least when the burring portion 44 is provided so as to extend from the one side of the tip end P to the other side thereof across the position of the tip end P of the impact beam 30 in the extending direction of the impact beam 30, it is possible to restrain such a situation that the recessed portion 42 of the bracket 40 deforms and the tip end P of the impact beam 30 makes point contact with the bottom surface of the recessed portion 42.

The shape of the burring portion 44 in the bracket 40 may not have an L-shape in a sectional view. For example, the tip end 44*b* of the burring portion 44 may be omitted such that the burring portion 44 is constituted only by the standing portion 44*a*. Further, the burring portion 44 may have a shape extending arcuately toward the outer side in the vehicle width direction. Further, the burring portion 44 is not limited to a shape standing toward the outer side in the vehicle width direction, but may have a shape standing toward the inner side in the vehicle width direction. That is, if the burring portion 44 has a shape standing toward the outer side or the inner side in the vehicle width direction, the burring portion 44 can function as a reinforcing portion with any shape.

The bracket 40 may be provided with a reinforcing portion different from the bead portion 43 and the burring portion 44. For example, a belt-shaped plate material (a reinforcement patch) or a columnar member (a reinforcement pillar) may be fixed to an outer surface or an inner surface of the bracket 40 in the vehicle width direction.

Either one of the bead portion 43 or the burring portion 44 in the bracket 40 may be omitted. Further, if the bracket 40 is provided with a reinforcing portion other than the bead portion 43 and the burring portion 44, the bead portion 43 and the burring portion 44 may be both omitted. That is, the bracket 40 should be provided with at least one reinforcing portion.

In the bending region R of the bracket 40, the direction where the tops T are provided so as to extend is not limited to the direction perpendicular to the extending direction of the impact beam 30. If the direction where the tops T are provided so as to extend intersects with the extending direction of the impact beam 30, the bending region R can function like the bending region R as described in the above embodiment. Further, the plurality of tops T may not be provided so as to extend in parallel to each other, but the plurality of tops T may be provided so as to extend in different directions as long as they do not intersect with each other.

The number of times of bending in the bending region R of the bracket 40, that is, the number of tops T can be changed appropriately. At least if several tops T are provided, the bending region R can function as a region that easily deforms at the time when a load toward the inner side in the vehicle width direction is applied to the bracket 40.

In the bending region R of the bracket 40, the bracket 40 may not be bent, but may be curved arcuately in a sectional view. That is, in the bending region R, the bracket 40 may be warped such that the tops T are formed.

The bending region R in the bracket 40 can be omitted. If there is a region that is not provided with the bead portion 43 and the burring portion 44 in the bracket 40 in the extending direction of the impact beam 30, the region easily deforms in comparison with a region provided with the bead portion 43 and the burring portion 44. Accordingly, at the time when a load toward the inner side in the vehicle width direction is applied to the bracket 40, the region that is not provided with the bead portion 43 and the burring portion 44 easily deforms preferentially.

In the end of the impact beam 30 on the vehicle rear side, the bracket 40 of the embodiment may be applied instead of the mounting bracket 35. That is, the bracket 40 of the embodiment should be applied to at least one of the end of the impact beam 30 on the vehicle front side and the end thereof on the vehicle rear side.

What is claimed is:

1. A vehicle door comprising:
    an outer panel which is plate-shaped;
    an inner panel including an inner wall portion, a side wall portion, and a flange portion,
        the inner wall portion opposing to the outer panel,
        the side wall portion being provided to extend toward the outer panel from an edge of the inner wall portion,
        the flange portion being connected with an edge of the side wall portion on an outer-panel side, the flange portion being fixed to the outer panel;
    an impact beam provided so to extend between the outer panel and the inner wall portion on a surface parallel to inner wall portion; and
    a bracket including a fixed portion, a joint portion, and a recessed portion,
        the fixed portion being fixed to the side wall portion or the flange portion,
        the joint portion being jointed to the impact beam on the outer-panel side,
        the recessed portion recessing toward an inner-panel side such that a tip end of the impact beam is distanced from the bracket,
    wherein
    in an extending direction of the impact beam, a yield strength of a first region for a load applied from the outer-panel side is lower than a yield strength of a second region, the first region being a region from the fixed portion to a tip end position of the impact beam, the first region including a part of recessed portion, the second region being a remaining part of the recessed portion.

2. The vehicle door according to claim 1, wherein the bracket has a connecting portion connecting between the fixed portion and the recessed portion.

3. The vehicle door according to claim 2, wherein the connecting portion is a bending region including a plurality of bending tops,
    each of the bending tops extends in a direction intersecting with the extending direction of the impact beam, and
    the bending tops are provided side by side in the extending direction of the impact beam.

4. The vehicle door according to claim 1, wherein the joint portion is an engageable portion constituted by a groove recessed toward the inner-panel side and provided so as to extend in the extending direction of the impact beam.

5. The vehicle door according to claim 1, wherein the recessed portion curves such that a central part in the extending direction of the impact beam approaches the inner panel.

6. The vehicle door according to claim 1, wherein the bracket includes a reinforcing portion provided so as to extend from the tip end position of the impact beam to the joint portion in the extending direction of the impact beam.

7. The vehicle door according to claim 6, wherein, in the extending direction of the impact beam, the reinforcing portion is provided so as to extend over an entire region where the recessed portion and the joint portion are provided.

8. The vehicle door according to claim 6, wherein the reinforcing portion is a bead portion projecting toward the outer-panel side or the inner-panel side and provided so as to extend along edges of the recessed portion and the joint portion.

9. The vehicle door according to claim 6, wherein the reinforcing portion is a burring portion formed such that a peripheral edge of the bracket is raised toward the outer panel or the inner panel.

10. The vehicle door according to claim 1, wherein the recessed portion is formed in a semielliptical shape recessed toward an inner side in a vehicle width direction in a sectional view perpendicular to the extending direction of the impact beam.

* * * * *